US 6,571,764 B1

United States Patent
Ottowitz et al.

(10) Patent No.: US 6,571,764 B1
(45) Date of Patent: Jun. 3, 2003

(54) DIRECT INJECTION INTERNAL COMBUSTION ENGINE

(75) Inventors: Alfred Ottowitz, Reichertshofen (DE); Rainer Wurms, Lenting (DE); Ralf Budack, Ingolstadt (DE); Thomas Rieger, Ingolstadt (DE); Murat Serifsoy, Ingolstadt (DE)

(73) Assignee: Audi AG (DE)

( * ) Notice: Subject to any disclaimer, the term of this patent is extended or adjusted under 35 U.S.C. 154(b) by 0 days.

(21) Appl. No.: 09/857,508

(22) PCT Filed: Dec. 1, 1999

(86) PCT No.: PCT/EP99/09311

§ 371 (c)(1),
(2), (4) Date: Jun. 2, 2001

(87) PCT Pub. No.: WO00/34633

PCT Pub. Date: Jun. 15, 2000

(30) Foreign Application Priority Data

Dec. 4, 1998 (DE) .......................... 198 56 016

(51) Int. Cl.⁷ ................................... F02B 5/00
(52) U.S. Cl. ...................... 123/305; 123/298; 123/302; 123/275
(58) Field of Search .................. 123/305, 302, 123/298, 260, 276, 261, 275

(56) References Cited

U.S. PATENT DOCUMENTS 4,920,937 A    5/1990  Sasaki et al. .............. 123/305
5,127,379 A    7/1992  Kobayashi et al. ......... 123/302
5,170,759 A   12/1992  Ito ............................. 123/276
5,215,053 A    6/1993  Ito ............................. 123/276
6,378,490 B1   4/2002  Ottowitz et al. ........... 123/305

FOREIGN PATENT DOCUMENTS

| DE | 3904760   | 10/1989 |
| DE | 19713028  | 10/1997 |
| DE | 19741380  | 3/1998  |
| DE | 19809066  | 9/1999  |
| EP | 0824185   | 2/1998  |
| JP | 9105330   | 4/1997  |
| JP | 100176596 | 6/1998  |
| JP | 100317974 | 12/1998 |
| JP | 110030124 | 2/1999  |
| WO | 9945249   | 9/1999  |

*Primary Examiner*—Tony M. Argenbright
*Assistant Examiner*—Katrina Harris
(74) *Attorney, Agent, or Firm*—Stevens, Davis, Miller & Mosher, LLP

(57) ABSTRACT

In a direct injection internal combustion engine having per cylinder at least two intake valves 1 mounted side by side, at least one exhaust valve 2, a more or less coaxial ignition device 3, an injection valve 4, and a piston 5 with combustion chamber trough 6, the injection valve 4 being mounted on the intake side, improved mixture preparation and combustion characterized by low fuel consumption and low exhaust emissions are achieved by mounting,the center of the combustion chamber trough 6 in the piston 5 noticeably displaced relative to the axis of the cylinder in the direction of at least one exhaust valve 2, and are achieved in that the boundary wall 7 of the combustion chamber trough 6 extends in projection along the axis of the cylinder between the ignition device 3 and injection valve 4.

16 Claims, 2 Drawing Sheets

DIRECT INJECTION INTERNAL COMBUSTION ENGINE

Figure 1:
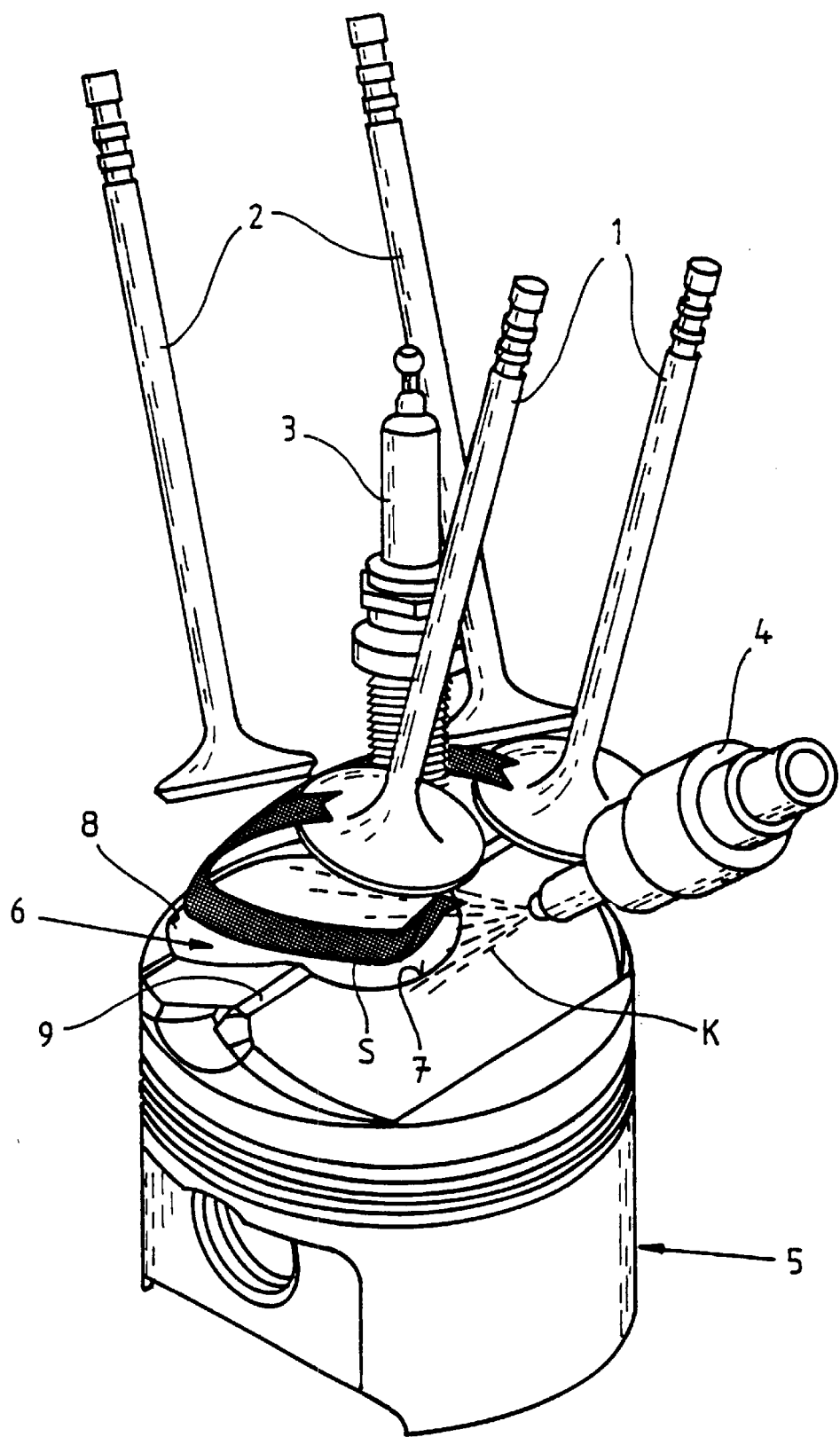

This invention relates to a direct injection internal combustion engine having per cylinder at least one intake valve, at least one exhaust valve, a more or less coaxial ignition device, an injection valve, and a piston with a combustion chamber trough, the injection valve being mounted on the intake side.

This invention also relates to a process for mixture preparation and combustion in such direct injection internal combustion engine.

Publication DE 197 41 380 A1 discloses a generic reciprocating internal combustion engine with direct fuel injection by a separately mounted fuel injection nozzle. This internal combustion engine has a tent shaped piston head and a tent shaped cylinder cover. Mounted in the piston head is a central rooflike extension which extends more or less symmetrically above the two rooflike surfaces of the piston head. A fuel injection nozzle which ends in the combustion chamber at a very small angle is mounted in the cylinder cover between the gas intake valves.

With this state of the art taken as a basis, it is the object of this invention to design an improved direct injection internal combustion engine and a process for mixture preparation and combustion, a process characterized by low fuel consumption in uniform lean-mixture operation and in stratified lean-fuel operation by low fuel consumption and low exhaust emissions.

In order to solve this problem the center of the combustion chamber trough in the piston is noticeably displaced toward at least one discharge valve opposite the axis of the cylinder and the boundary wall of the combustion chamber trough on the intake side extends in a projection along the axis of the cylinder between the ignition device and the injection valve. As a result of this design of the combustion chamber trough the mixture is prepared inside the combustion chamber with particularly great efficiency and combustion is characterized by low pollutant values. For this purpose the fresh air entering the combustion chamber in tumble flow through the intake openings controlled by the adjacent intake valves and flowing downward toward the piston on the cylinder wall opposite the intake valves and the fuel, which is injected through the injection valve earlier or later, depending on the operating condition of the internal combustion engine, is uniformly mixed by means of the combustion chamber trough displaced toward the discharge side, or alternatively is prepared as a stratified charge and by means of the boundary wall of the combustion chamber trough is deflected near the axis of the cylinder toward the ignition device and is ignited there. Hence the prepared mixture is moved directly from the combustion chamber trough to the ignition device, and not first guided along the cylinder wall and/or the top of the combustion chamber before finally reaching the ignition device.

In order to sustain the fresh air tumble flow, when there are two intake valves the centers of the disks of the intake valves should, in accordance with an advantageous development of the invention, be positioned a maximum distance from each other and in the closed position be positioned a minimum distance from the axis of the crankshaft. This feature additionally facilitates mounting of the injection valve between the intake valves.

The intake valve should be mounted at an angle of approximately 30 to 80 degrees to the axis of the cylinder, so that the area of the boundary wall of the combustion chamber trough on the intake side near the axis of the cylinder of the injected fuel can be reached.

In addition, the injection valve should have a central stream axis which extends at an angle of approximately 55 to 70 degrees to the axis of the cylinder, so that the stream is positioned in the combustion chamber at a relatively steep angle to the axis of the cylinder.

For the sake of homogeneous lean operation the injection valve injects fuel into the cylinder during the intake cycle at a crankshaft angle of approximately 380 to 160 degrees, depending on engine speed, before reaching top dead center. Thus fuel is injected more or less in the center of the fresh air flow prevailing in the combustion chamber, so that the fuel and the fresh air may be mixed uniformly.

And for stratified lean operation the injection valve injects fuel into the cylinder during the injection cycle at a crankshaft angle of approximately 120 to 20 degrees, before the piston reaches top dead center. Hence the fuel is injected mostly in advance of the fresh air tumble flow, is stabilized by the fresh air flow in an ignitable charge cloud above the boundary wall near the injection valves, and finally is transported to the ignition device. In the process the boundary wall of the combustion chamber trough on the intake side serves both to guide or concentrate the fresh air tumble flow and to deflect the resulting ignitable mixture cloud.

By preference the width of the combustion chamber trough amounts to approximately two-thirds of the diameter of the piston. As a result, the fresh air tumble flow moving through the combustion chamber trough can be sustained over a large area.

By special preference the combustion chamber trough is mounted displaced so far to the side of at least one exhaust valve that the center of the trough or the center of gravity of its volume is positioned about a third of the diameter of the piston away from the edge of the piston on the outlet side. As a result of this feature, the boundary wall on the exhaust side is positioned on the edge of the piston, so that no large areas of low flow velocities may be formed on the discharge side of the combustion chamber.

If the boundary wall of the combustion chamber trough on the exhaust side near the axis of the cylinder is designed to slope gently toward the head of the piston and the boundary wall of the combustion chamber trough remote from the axis of the cylinder to slope steeply toward the head of the piston, the fresh air flow can enter the combustion chamber trough on the boundary wall on the exhaust side and can be deflected optimally in the direction of the ignition device when emerging from the combustion chamber trough on the boundary wall on the intake side.

So that the fuel stream emerging from the injection valve may reach the combustion chamber without direct wetting of the piston, a small recess is provided in the piston, which recess extends from the boundary wall of the combustion chamber trough on the intake side and is coordinated with the shape of the fuel stream.

The problem posed for this invention is also solved by a process of fuel mixture preparation and combustion in a direct injection internal combustion engine as described in one of claims 1 to 11. In this process there is formed in the combustion chamber an intensive charge movement, such that the fresh air, initially directed by way of the cylinder wall, enters the combustion chamber trough by way of the boundary wall on the exhaust side, is accelerated toward the center of the combustion chamber trough, and is deflected by the boundary wall of the combustion chamber trough on the intake side, and such that the fuel is injected more or less transversely to the fresh air flow, which in this phase is directed vertically upward.

The process claimed for the invention is characterized among other things also by the fact that the period between the end of injection of the fuel corresponds to approximately 10 to 25 crankshaft angle degrees. Effective mixing of fresh air is definitely ensured over this relatively long period.

Figure 3:
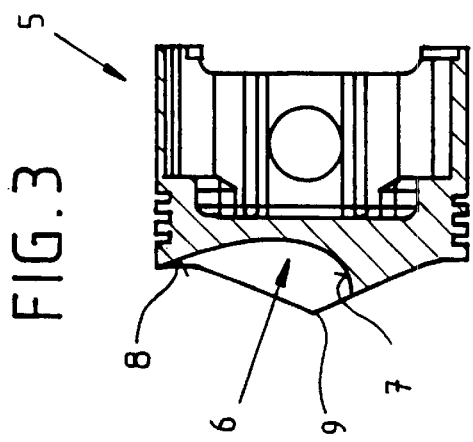
Figure 2:
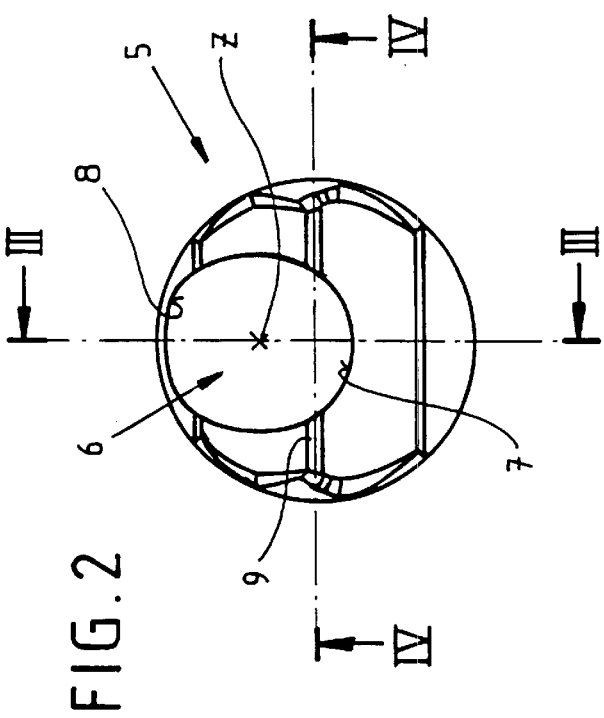

This invention is explained in detail with reference to the following drawing figures, in which FIG. 1 presents a perspective view of the layout of four gas exchange valves, ignition device, injection valve, and piston of a direct injection internal combustion engine in a simplified presentation;

FIG. 2 a top view of the piston of FIG. 1;

FIG. 3 a sectional view of the piston of FIG. 2 along line III—III; and

Figure 4:
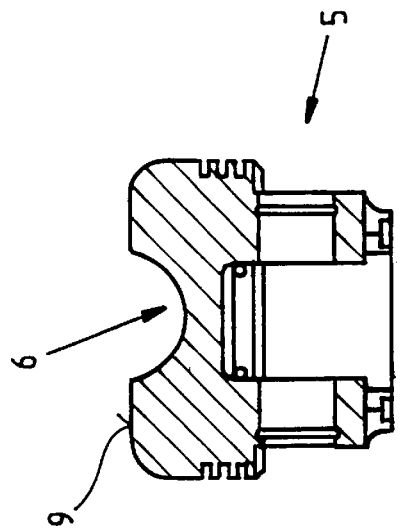

FIG. 4 a sectional view of the piston of Figure along line IV—IV.

The internal combustion engine claimed for the invention is shown by FIG. 1 to be provided with two intake valves per cylinder mounted side by side. These two intake valves 1 are situated on the intake side of a cylinder (not shown) and two exhaust valves 2, also mounted side by side, are mounted on the exhaust side of the cylinder. In addition, the internal combustion engine has an ignition device 3 mounted concentrically with the axis of the cylinder. One injection valve 4 is also provided per cylinder, which valve is mounted between the two intake valves 1 and the section of the cylinder wall adjacent to both intake valves 1. The piston 5 mounted in the cylinder of the internal combustion engine has a combustion chamber trough 6 which is mounted opposite the axis of the cylinder noticeably displaced toward the side of the two exhaust valves 2 and has a steep boundary wall 7 on the intake side and a gently sloping boundary wall 8 on the exhaust side. The width of the combustion chamber trough 6 is about two-thirds the diameter of the piston 5 and the center Z or volume center of gravity of the combustion chamber trough 6 is positioned approximately one-third of the diameter of the piston 5 from the edge of the piston 5 on the exhaust side of the latter and approximately one-sixth the diameter of the piston 5 from the axis of the cylinder.

The fresh air flowing into the cylinder through the two intake valves 1 forms a tumble flow S inside the combustion chamber. This is enhanced if the two intake valves 1 are spaced a maximum distance from each other. In addition, maximum distance between the two intake valves 2 facilitates positioning of the injection valve 4.

If, however, the direct injection internal combustion engine is to have only one intake valve, the tumble flow may be generated inside the combustion chamber trough by flow control means mounted in the intake duct.

Fresh air tumble flow S moves over the boundary wall 8 on the exhaust side into the combustion chamber trough 6 and, on emerging from the combustion chamber trough 6, is deflected on the boundary wall 7 toward the ignition device 3. Since the center Z of the combustion chamber trough 6 is positioned opposite the axis of the cylinder so as to be displaced toward the exhaust side and the boundary wall 7 of the combustion chamber trough 6 is mounted below the ignition device 3, mixture preparation is especially favored in that the mixture moves directly toward the ignition device 3.

The two intake valves 1 are positioned parallel to each other and are mounted so as to be tilted at an angle, one toward the ignition device 3 and the other toward the axis of the cylinder. The two exhaust valves 2 are also positioned parallel to each other and are mounted so as to be tilted at an angle toward the axis of the cylinder in the direction opposite that of the intake valves 1.

The injection valve 4 of the internal combustion engine is mounted so as to be tilted toward the axis of the cylinder, the angle of inclination α of the injection valve 4 being approximately 30 to 80 degrees. As a result, the injection valve 4 is inclined toward the axis of the cylinder at an angle steeper than that of the adjacent intake valves 1.

If the internal combustion engine now operates in homogeneous lean-mixture operation, the injection valve injects fuel during the intake cycle 4, at a crankshaft angle of approximately 380 to 160 degrees, before the piston 5 has reached top dead center, into the fresh air flow S guided through the combustion chamber trough 6 and deflected by the boundary wall 7 on the intake side. This results in a high relative velocity of fresh air and fuel, so that injection of a sufficient amount of fuel and homogeneous mixing of fresh air and fuel can take place in the shortest time possible.

On the other hand, if the internal combustion engine operates in stratified lean-mixture operation, the injection valve 4 injects fuel into the combustion chamber trough 6 during the compression stroke, at a crankshaft angle of approximately 120 to 20 degrees, before the piston 5 reaches the top dead center, in advance of the fresh air tumble flow deflected by the boundary wall 7 on the intake side. The fresh air tumble flow S ensures that the fuel stream K injected will be stabilized in an ignitable charge mist near the injection valve 4 inside the combustion chamber trough 6 and will be delivered to the ignition device 3 by further compression movement of the piston 5, so that the ignitable portion of the mixture mist can be reached by an ignition spark of the ignition device 3 mounted coaxially in the cylinder.

Lastly, the piston 5 is designed so as to be rooflike and has a straight gable 9. This shape is coordinated with the gas exchange valves 1, 2 each of which is mounted so as to be inclined toward the axis of the cylinder and permits design of an extremely compact combustion chamber for the direct injection internal combustion engine.

What is claimed is:

1. A direct injection internal combustion engine which has per cylinder at least one exhaust valve, at least one intake valve located opposite the at least one exhaust valve, an ignition device substantially coaxial with the cylinder, an injection valve, and a piston with a combustion chamber trough located on a head of the piston, the injection valve mounted on an intake side opposite the at least one exhaust valve, characterized in that the volumetric center of the combustion chamber trough is located on a side of the piston nearest the at least one exhaust valve; an intake-side boundary wall on the intake side of the combustion chamber trough located between the ignition device and the injection valve extends in a direction substantially parallel to the axis of the cylinder; and an exhaust-side boundary wall of the combustion chamber trough opposite the intake side ends inclined at a small acute angle to the head of the piston.

2. An internal combustion engine as described in claim 1, wherein, with at least two intake valves, valve head centers of the intake valves are spaced a maximum distance from each other.

3. An internal combustion engine as described in claim 2, wherein, with at least two intake valves, valve head centers of the intake valves are spaced when in the closed position a minimum distance from the axis of the crankshaft.

4. An internal combustion engine as described in claim 1, wherein the injection valve is mounted inclined at an angle of approximately 30 to 80 degrees to the axis of the cylinder.

5. An internal combustion engine as described in claim 1, wherein the injection valve has a central stream axis which extends at an angle of approximately 55 to 70 degrees to the axis of the cylinder.

6. An internal combustion engine as described in claim 1, wherein the injection valve injects fuel into the cylinder during the intake cycle at a crankshaft angle of approximately 380 to 160 degrees, before the piston reaches top dead center.

7. An internal combustion engine as described in claim 1, wherein the injection valve injects fuel into the cylinder during the compression stroke at a crankshaft angle of approximately 120 to 20 degrees, before the piston reaches top dead center.

8. An internal combustion engine as described in claim 1, wherein the width of the combustion chamber trough is approximately two-thirds the diameter of the piston.

9. An internal combustion engine as described in claim 1, wherein the combustion chamber trough is mounted displaced a distance towards the side of the at least one exhaust valve such that the volumetric center of the combustion chamber trough is positioned approximately one-third the diameter of the piston away from the edge of the piston.

10. An internal combustion engine as described in claim 1, wherein a small recess located on the head of the piston extends from the boundary wall of the combustion chamber trough on the intake side and is coordinated with the shape of the fuel stream.

11. A process for mixture preparation and combustion with a direct injection internal combustion engine as described in claim 1 comprising the following steps: drawing fresh air from the at least one intake valve: directing the fresh air across the cylinder towards the exhaust-side boundary wall down into the combustion chamber trough, and back towards the center of the head of the piston: deflecting the fresh air against the intake-side boundary wall; and injecting fuel spray into the fresh air.

12. A process as described in claim 11 characterized in that the fresh air is deflected by the intake-side of the combustion chamber trough in the direction of the ignition device.

13. A process as described in claim 11, wherein the period between the end of injection of fuel and ignition of the fuel corresponds to a crankshaft angle of approximately 10 to 25 degrees.

14. A direct injection internal combustion engine comprising a plurality of cylinders, each cylinder comprising at least one exhaust valve, at least one intake valve located opposite the at least one exhaust valve, an ignition device substantially coaxial with the cylinder, an injection valve mounted on an intake side opposite the at least one exhaust valve and a piston having a combustion chamber trough located on a head of the piston, wherein the volumetric center of the combustion chamber trough is located on a side of the piston nearest the at least one exhaust valve, an intake-side boundary wall on the intake side of the combustion chamber trough located between the ignition device and the injection valve extends in a direction substantially parallel to the axis of the cylinder, and an exhaust-side boundary wall of the combustion chamber trough opposite the intake side ends near the edge of the head of the piston.

15. A process for mixture preparation and combustion with a direct injection internal combustion engine as described in claim 14 comprising the following steps:

drawing fresh air from the at least one intake valve;

directing the fresh air across the cylinder towards the exhaust-side boundary wall, down into the combustion chamber trough, and back towards the center of the head of the piston;

deflecting the fresh air by the intake-side boundary wall towards the ignition device; and injecting fuel spray into the deflected fresh air.

16. A process as described in claim 15, wherein the period between the end of injection of fuel and ignition of the fuel corresponds to a crankshaft angle of approximately 10 to 25 degrees.

* * * * *